United States Patent
Fontaine

[11] 3,895,698
[45] July 22, 1975

[54] BRAKE CONTROL APPARATUS
[75] Inventor: John G. Fontaine, Fort Lauderdale, Fla.
[73] Assignee: Fail Safe Brake Corporation, Fort Lauderdale, Fla.
[22] Filed: Oct. 4, 1974
[21] Appl. No.: 511,998

Related U.S. Application Data
[62] Division of Ser. No. 300,128, Oct. 24, 1972.

[52] U.S. Cl. ............... 192/3 TR; 188/353; 303/19; 303/89
[51] Int. Cl.[2] ................ B60K 41/20; B60T 17/16
[58] Field of Search ........... 192/3 TR, 3 T; 303/89, 303/2, 3, 4, 18, 19, 21 R, 21 A; 188/265, 188/353, 109, 152; 180/101, 82 R

[56] References Cited
UNITED STATES PATENTS

| | | | |
|---|---|---|---|
| 2,079,978 | 5/1937 | Weiss | 192/3 TR |
| 2,837,186 | 6/1958 | Price | 188/353 X |
| 2,843,235 | 7/1958 | Weaver | 192/3 TR |
| 2,904,134 | 9/1959 | Cieply, Jr. | 192/3 TR X |
| 3,127,966 | 4/1964 | Sheriff et al. | 192/3 TR |
| 3,298,471 | 1/1967 | Evans | 188/353 |
| 3,426,872 | 2/1969 | Irie et al. | 192/3 TR X |
| 3,433,336 | 3/1969 | Mizano | 192/3 TR |
| R21,640 | 11/1940 | Whittington | 192/3 TR |

Primary Examiner—Trygve M. Blix
Assistant Examiner—Douglas C. Butler
Attorney, Agent, or Firm—Oltman and Flynn

[57] ABSTRACT

Apparatus for controlling hydraulic brakes of a vehicle in which brakes are applied by hydraulic pressure in a conduit responsive to a depression of a brake pedal, the apparatus including an automatic two-way valve in the conduit for closing the conduit automatically to keep hydraulic pressure applied to the brakes after depression of the foot pedal and for opening to release the hydraulic pressure, and a control system for operating the automatic valve. The control system includes a first circuit having a speed responsive device, a second circuit having an accelerator responsive device, and a third circuit having a solenoid valve for operating the automatic two-way valve. When both the first and second circuits are opened by the speed responsive device and the accelerator responsive device, the solenoid valve is energized to close the automatic two-way valve for keeping the hydraulic pressure in the brake conduit applied to the brakes. The automatic two-way valve is preferably vacuum operated. It is bypassed by a check valve which allows increasing hydraulic pressure produced by the brake pedal to bypass the two-way valve so as to apply the brakes with greater force.

10 Claims, 3 Drawing Figures

BRAKE CONTROL APPARATUS

RELATED APPLICATION

This application is a division of my co-pending U.S. patent application Ser. No. 300,128, filed Oct. 24, 1972.

BACKGROUND OF THE INVENTION

My U.S. Pat. Nos. 3,830,330, 3,831,698 and 3,831,703 and my co-pending U.S. patent application Ser. No. 365,556, filed May 31, 1973, now U.S. Pat. No. 3,842,950, disclose automatic braking apparatus for vehicles in which the parking and emergency brake of the vehicle is actuated automatically to stop the vehicle or to keep the vehicle stopped upon the occurrence of any one of a plurality of conditions. In one of these conditions, the parking and emergency brake is applied automatically within about 3 seconds after the vehicle has been braked to a complete stop in order to prevent creeping of the vehicle. This is an important feature, and the present invention utilizes this feature to good advantage.

In the U.S. patents and application just referred to, however, the parking and emergency brake is applied by a spring which is opposed by fluid pressure derived from either a hydraulic steering system or a special hydraulic supply. The system does not utilize the hydraulic brake system of the vehicle directly.

My U.S. Pat. No. 3,763,975 discloses improvements on the basic system, still, however, using a spring opposed by hydraulic pressure to apply the parking and emergency brakes automatically. Again, the basic hydraulic service brake system of the vehicle is not directly utilized.

SUMMARY OF THE INVENTION

The present invention provides brake control apparatus for directly controlling the hydraulic service brakes of a vehicle utilizing an automatic two-way valve and an automatic electrical control system for operating the two-way valve. A speed responsive device and an accelerator responsive device are provided in the control system. When these devices open corresponding circuits, the two-way valve is closed to keep hydraulic pressure in the service brake system applied to the brakes and thus prevent the vehicle from creeping. A check valve bypasses the two-way valve so that when the latter valve is closed, fluid pressure applied by the brake pedal can bypass the two-way valve to reach the brakes for applying them with more force. The two-way valve is preferably vacuum operated, and the control system includes another circuit with a solenoid valve for applying vacuum to the two-way valve.

Accordingly, an object of the present invention is to provide an improved apparatus for controlling hydraulic brakes of a vehicle.

Another object of the invention is to provide such a brake control apparatus which prevents creeping of the vehicle after it has been stopped.

Another object of the invention is to completely eliminate the problem of creeping of a vehicle which occurs when the motor is running and the automatic transmission is in drive.

Another object of the invention is to not only cure the matter of creeping forward or rearward when stopped, but also to add to driving pleasure, comfort, ease and safety of the driver, the passengers and pedestrians since the brake control apparatus has no unnatural requirements such as requiring the driver to wait for signals or the like before removing his foot from the brake pedal in order to take advantage of the creeping control feature.

Still another object of the invention is to provide brake control apparatus which can incorporate any desired number of switches which will keep the vehicle stopped when a predetermined condition occurs, such as the opening of a door in a school bus while children are either entering or leaving, the removal of a nozzle of a fuel truck from its cradle, a driver leaving the driver's seat and other conditions.

A further object of the invention is to provide a brake control system in kit form or otherwise capable of finding application in all vehicles having hydraulic brakes whether power equipped or otherwise, and which is easily installed, durable and capable of being produced at a low cost.

Other objects of this invention will appear from the following description and appended claims, reference being had to the accompanying drawings forming a part of this specification wherein like reference characters designate corresponding parts in the several views.

Figures 1, 2, 3:
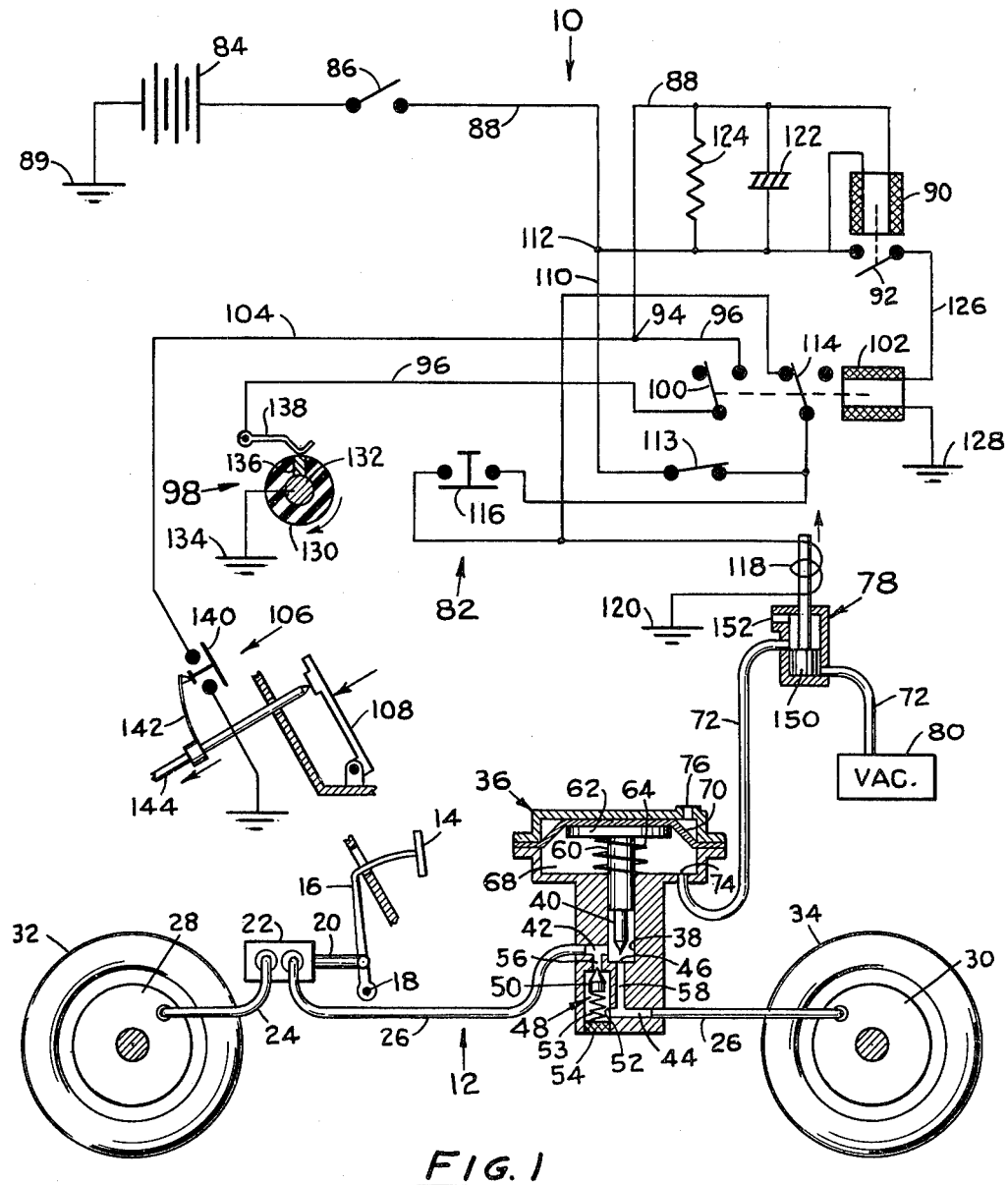
FIG. 1 is a schematic drawing showing an automatic braking system provided with brake control apparatus in accordance with one embodiment of the present invention.
FIG. 2 is a schematic view of an accelerator responsive device which can be utilized as an alternate in the system of FIG. 1.
FIG. 3 is a schematic view of an accelerator responsive device which can be used as another alternate in the system of FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

The vast majority of motor vehicles on the road today are equipped with automatic transmissions. They are accepted by the motoring public as a substantial improvement over standard transmissions. They do, however, have an objectionable drawback: at all times the motor is running with the gear shift in drive, the vehicle creeps. Not only is this found to be objectionable and considered by many to be a nuisance since the driver has to hold the service brake pedal depressed to keep the vehicle stopped, it is also hazardous. Accidents have occurred when drivers inadvertently have eased their foot pressure on the brake pedal and the vehicle has crept forward into the line of traffic. Sometimes pedestrians have been struck while walking in front of such vehicles.

Automobile manufacturers have attempted to reduce the amount of creeping by lowering idling speed of the motor, in many instances to a lower revolution per minute than they would undoubtedly do otherwise to assure smooth idling performance without engine stall.

With the advent of motor pollution control devices, the matter or creeping has been aggravated. On a cold morning one can move at a fair speed without depressing the accelerator pedal at all.

Therefore, one of the main objectives of the present invention is to completely eliminate the creeping problem in an inexpensive and effective manner without adding other problems for either the manufacturer or the driver in doing so.

The brake control apparatus of the present invention achieves this objective, and at the same time is simple to construct, easy to install, is durable and can be manufactured at low cost, thereby making it available to the motoring public at a reasonable price.

FIG. 1 shows an automatic braking system including a brake control apparatus 10 which operates the hydraulic service brake system 12 of a vehicle which is shown only schematically. The hydraulic service brake system 12 of the vehicle includes the usual foot operated brake pedal 14 having an arm 16 pivoted at 18 and connected by a linkage 20 to a master brake cylinder 22. From the brake cylinder 22, conduits 24 and 26 lead to the service brakes 28 and 30 associated with the front and rear wheels 32 and 34 of the vehicle. The vehicle is equipped with an automatic transmission (not shown).

The brake control apparatus 10 may be arranged to control the front brakes 28, the rear brakes 30 or both front and rear brakes if desired. In the illustrated embodiment, the apparatus 10 controls the rear brakes 30, and it will be understood that there are rear brakes 30 for both rear wheels of the vehicle.

The brake control apparatus 10 includes an automatic two-way valve 36 which in this embodiment is vacuum operated. The particular valve 36 illustrated in the drawings has a bore 38 in which a needle element 40 can move reciprocatively. The bore 38 has an inlet 42 and an outlet 44 communicating with it. The conduit 26 is connected to opposite sides to the inlet 42 and the outlet 44 such that the valve 36 is connected into the conduit 26. Hydraulic fluid can flow through the conduit 26 and the valve 36 in both directions when the valve is open. When the plunger 40 is closed against the orifice 46, the valve is closed and blocks flow of hydraulic fluid in the conduit 26. For example, if the service brake pedal 14 is depressed when the valve 36 is open, the brakes 28 and 30 will be applied. If the valve 36 then closes, the pressure applied to brakes 30 will not be released, and this keeps the brakes firmly applied to prevent creeping.

The brake control apparatus of this embodiment also includes a check valve 48 which is incorporated directly into the valve 36. It will be understood, however, that the check valve 48 could be provided as a separate unit. The check valve 48 is connected between opposite sides of the valve 36 so that increasing pressure in conduit 26 can bypass valve 36 through the check valve 48 to reach the rear brakes 30. Consequently, when the valve 36 is closed, the brake pedal 14 can still be effective when depressed to apply increasing pressure to the brakes 30.

In the illustrated embodiment, the check valve 48 consists of a plunger 50 in a bore 52 that is closed by a plug 54. The plunger 50 is urged by compression spring 53 against an orifice 56 to keep that orifice normally closed. When pressure builds up in the orifice 56, the plunger 50 opens the orifice to allow fluid to flow through an outlet 52 which communicates with the outlet 44 and conduit 26. Hydraulic fluid is supplied to the check valve 48 through the inlet 42 which connects to the orifice passage 56. Thus, the check valve 48 bypasses the valve 36 and will allow fluid to flow around that valve in order to increase pressure on the brakes, but will not allow fluid to flow back through the reverse path when the valve 36 is closed.

Valve 36 includes a plunger 60 having a head 62 which is biased upwardly by a coil spring 64. The head 62 and the spring 64 are located in a chamber 58 which is divided into an upper half and a lower half by a diaphragm 70. A conduit 72 is connected to the lower half of chamber 68 through an inlet 74. A vent passage 76 vents the upper half of chamber 68 to the atmosphere. Conduit 72 passes through a solenoid valve 78 to a vacuum source 80 which may be a tank located in the vehicle.

The solenoid valve 78 is part of the control system 82 of the apparatus 10. The control system 82 includes the battery 84 of the vehicle and the ignition switch 86 of the vehicle which are connected in the main voltage supply circuit 88. The battery is grounded at 89.

The main supply circuit 88 is connected to a relay coil 90 having contacts 92 which are normally open. The supply circuit 88 continues to terminal 94 where it branches into a first circuit 96 connected to a speed responsive device 98. Contact 100 of relay 102 is in the first circuit 96 and normally interrupts that circuit.

The main supply circuit 88 also branches into a second circuit 104 which is connected to an accelerator responsive device 106 that includes the accelerator pedal 108 of the vehicle. A third circuit 110 connects to the main supply path 88 at terminal 112 and connects through a normally closed on-off switch 113, movable contact 114 of relay 102, normally open function switch 116 and the coil 118 of solenoid 78 to ground at 120. A capacitor 122 and a resistor 124 are connected in parallel with each other across the relay coil 90 and serve to delay the opening of movable contact 92 when the relay is de-energized. The action of the relay 90, 92 will be explained later. It may be noted that a fourth circuit 126 connects to movable contact 92 and also connects through relay coil 102 to ground at 128.

The speed responsive device 98 includes an insulating rotary member 130 having a conducting core 132 which is grounded at 134. A conductive segment 136 extends through the insulating rotary member 130 and connects to the conducting core 132. A brush contact 138 rides on the exterior of the rotating member 130 and is capable of making contact with the conductive segment 136 as the member 130 rotates. Thus, the speed responsive device 98 constitutes an intermittent current conductor for making and breaking the first circuit 96.

The accelerator responsive device 106 which is associated with the accelerator pedal 108 includes a normally open switch 140 connected in circuit 104. The switch 140 is actuated by an arm 142 which may be a bi-metallic strip that is responsive to temperature to adjust the position of the movable part of the switch 140 for temperature compensation to keep the same stroke. This compensates for another bi-metallic element usually provided on the throttle to keep the automatic choke on. Arm 142 is mounted on a shaft 144 that is biased to the right and can be depressed by depression of the accelarator pedal 108. When the accelerator pedal 108 is depressed, arm 142 closes switch 140, and when the accelerator pedal 108 is released, shaft 144 returns to its initial position to open switch 140.

OPERATION

The switch 116 is normally closed, but it is ordinarily held open when the vehicle is in operation. For example, the switch 116 will be closed when the door of the vehicle is opened. This function is particularly useful when the vehicle is a school bus to have the vehicle remain stationary until the doors are closed. However, the switch 116 may be closed by some other function such as the removal of a nozzle of a fuel truck from its cradle, or the driver leaving the driver's seat of the vehicle, by way of example. Alternately, separate switches can be provided in the third circuit 110 for multiple purposes.

When the driver closes the ignition switch 86 and removes his foot from the accelerator pedal 108, the circuit 110 is completed through solenoid coil 118 thus energizing the solenoid 78. The plunger 150 of the solenoid rises to open circuit 72 and block off the vent outlet 152 of the solenoid valve 78. Vacuum is then applied to the lower half of the chamber 68 thus causing the plunger 60 and this needle element 40 to be depressed and close the orifice 46. Assuming that the brake pedal 14 of the vehicle is not depressed at this time, the brakes will remain released. The driver normally then shifts the transmission into gear and drives away. When he does this, he depresses the accelerator pedal 108 which closes switch 140 of the accelerator responsive device 106. Speed responsive device 98 is also rotating so that the segment 136 intermittently makes contact with the brush 38 so that circuit 96 is intermittently closed. Current then flows through circuit 88 and circuits 96 and 104 to ground. The current flow through relay coil 90 closes movable contact 92. Current then also flows through circuit 126 including relay coil 102 so as to move relay contacts 100 and 114 to the right. When relay contact 114 moves to the right, circuit 110 is opened to de-energize the solenoid valve 78. The de-energization of solenoid valve 78 removes vacuum from the automatic two way valve 36 so that the spring 60 causes the valve to open. Once the valve is open, it will remain open so long as the speed of the vehicle exceeds a predetermined minimum speed which may be approximately 4 miles per hour.

When the driver wishes to stop the vehicle, he depresses the service brake pedal 14 and applies the hydraulic brakes 28 and 30. When the driver applies the brakes, he normally releases the accelerator pedal 108, and this opens switch 140 breaking circuit 104. However, relay coil 90 will not be de-energized so long as the vehicle is exceeding a speed of approximately 4 miles per hour because the segment 136 of speed responsive device 98 is intermittently making contact with brush 138 for only a short time to keep the capacitor 122 charged. When the speed of the vehicle drops below the minimum threshold, the capacitor 122 will discharge sufficiently to de-energize relay coil 90. Movable contact 92 then opens to de-energize relay coil 102 so that movable contact 100 and 114 move to the left. Circuit 96 is then broken and circuit 110 is completed.

The completing of circuit 110 causes the coil 118 of solenoid valve 78 to be energized again, and this closes the automatic two-way valve 36. The closing of valve 36 keeps the pressure which has been applied to the brakes by the depression of the brake pedal 14 from being released. In other words, the hydraulic pressure on the rear brakes 30 is trapped because the valve 36 is closed. The vehicle will stay stopped and will not creep until the driver depresses the accelerator pedal 108 again. The driver can take his foot off the brake pedal 14 and the vehicle still will not creep. If the driver again depresses the brake pedal 14 with increased pressure, the increased hydraulic pressure will pass through check valve 48 to increase the brake pressure on the rear brakes 30. The driver can then release this pressure, and the vehicle will remain stopped without any creeping. As soon as the driver depresses the accelerator pedal 108, the valve 36 is opened according to the preceding cycle, and the vehicle can move. If the car is travelling at say 35 miles an hour and through some malfunction the sealing valve 36 closes, the driver can still apply the service brakes to stop the vehicle. When the brake pedal 14 is depressed, the hydraulic pressure passes through check valve 48 to reach the rear brakes 30 and thus bring the vehicle to a stop.

The accelerator responsive device 106 can take different forms. An alternative form of this device is shown in FIG. 2, and the same reference numerals have been used for like parts with the addition of a prime designation to distinguish the different forms. In this embodiment, the accelerator pedal 108' has the switch 140' mounted directly on the rear of the accelerator pedal. The switch housing 141' is mounted on the back of the accelerator pedal 108'. The movable contact 140' touches a shaft 144' which is movable to the left and is urged by a spring to the right. When the accelerator pedal 108' is depressed the resistance of the spring and shaft 144' causes the movable contact 140' to be closed against the fixed contacts of the switch. Further depression of the accelerator pedal 108' moves the shaft 144' to the left. When the accelerator pedal 108' is released, the movable contact 140' is opened. The movable contact 140' will close upon depression of the accelerator pedal 108' before the butterfly valve of the throttle is open, and this is believed to be a desirable advantage.

A second modified form of the speed responsive device 106 is shown in FIG. 3, this embodiment being designated 106" to distinguish it from the other forms. In this form, the accelerator pedal 108" butts against an arm 109" which is provided at 111" and is connected to a shaft 144" upon which a switch contact 104" is mounted. The arm 144" may connect directly to the throttle 145". When the accelerator pedal 108" is depressed, the switch 140" closes, and when the accelerator pedal 108" is released, the switch 140" opens. The shaft 144" might be replaced by a cable which has enough slack in it to allow the switch 104" to open before the throttle 145" opens. This would allow the brakes to release before the throttle is on.

It may be noted that when the ignition switch 86 is open, the brake control apparatus 10 is completely deactivated. This is advantageous because the hydraulic brakes will not be left applied for long periods of time, thus tending to cause damage to the seals and other parts of the brakes when the vehicle is left parked for long periods of time.

It may also be noted that circuit 96 is opened because movable contact 100 is open except when circuit 104 is completed. An advantage of this arrangement is that if the vehicle should happen to move very slightly, for example by a very heavy wind, and the segment 136 should come into contact with the brush 138, the circuit 96 will not be completed, so the creeping control will not be released.

Having thus described my invention, I claim:

1. Apparatus for controlling hydraulic brakes of a vehicle in which brakes are applied by hydraulic pressure in a conduit responsive to depression of a brake pedal, said apparatus comprising two-way vacuum operated valve means in said conduit for closing said conduit to keep hydraulic pressure applied to the brakes after depression of said foot pedal and for opening to release the hydraulic pressure, and control means for operating said valve means including a first circuit having speed responsive means therein for breaking said first circuit when the vehicle is stopped, a second circuit having accelerator responsive means therein for breaking said second circuit when an accelerator of the vehicle is released, and a third circuit having solenoid valve means therein controlling a vacuum line for operating said two-way vacuum valve means, with the breaking of both of said first and second circuits causing energization of said solenoid valve means to close said two-way vacuum valve means for keeping the hydraulic pressure in said conduit applied to the brakes.

2. The apparatus as claimed in claim 1 including check valve means connected around said two-way vacuum valve means for allowing increasing hydraulic pressure in said conduit to bypass said two-way vacuum valve means to the brakes when said two-way vacuum valve means is closed.

3. The apparatus as claimed in claim 2 in which said third circuit includes switch means for making and breaking the same.

4. The apparatus as claimed in claim 3 in which said third circuit includes a relay having contacts for making and breaking said third circuit responsive to the action of said speed responsive means and said accelerator responsive means.

5. The apparatus as claimed in claim 1 in which said accelerator responsive means includes an accelerator pedal and switch means affixed to said pedal.

6. The apparatus as claimed in claim 5 in which said switch means includes a movable contact element and a bi-metallic arm connected to said movable contact element.

7. Apparatus for controlling hydraulic brakes of a vehicle in which brakes are applied by hydraulic pressure in a conduit responsive to depression of a brake pedal, said apparatus comprising automatic two-way valve means in said conduit for closing said conduit to keep hydraulic pressure applied to the brakes after depression of said foot pedal and for opening to release the hydraulic pressure, check valve means connected between opposite sides of said two way valve means for allowing increasing hydraulic pressure in said conduit to bypass said two-way valve means to the brakes when said two way valve means is closed, and electrical control means for operating said two way valve means including a first circuit having speed responsive means therein for breaking said first circuit when the vehicle is stopped, and a second circuit having accelerator responsive means therein for breaking said second circuit when an accelerator of the vehicle is released, with the breaking of both of said first and second circuits causing said two way valve means to close for keeping the hydraulic pressure in said conduit applied to the brakes, said control means having relay contact means for breaking said first circuit except when said second circuit is completed.

8. The apparatus as claimed in claim 7 including a third circuit having solenoid means for operating said two-way valve means.

9. The apparatus as claimed in claim 8 in which said third circuit includes switch means for making and breaking the same.

10. The apparatus as claimed in claim 9 in which said relay has further contact means for making and breaking said third circuit.

* * * * *